Sept. 29, 1942.  F. E. TIFFANY  2,297,177
FRUIT CUTTING APPARATUS
Filed June 19, 1940
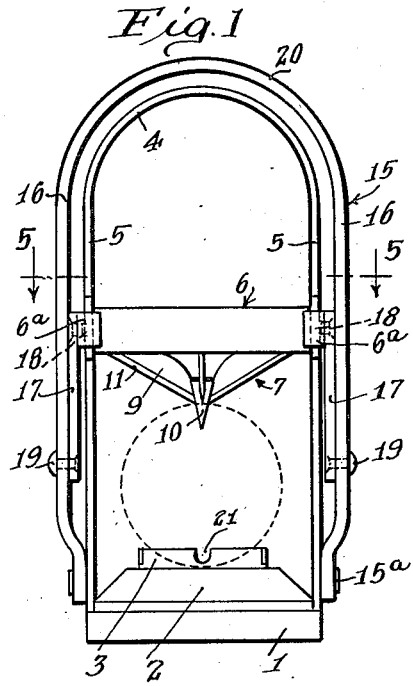
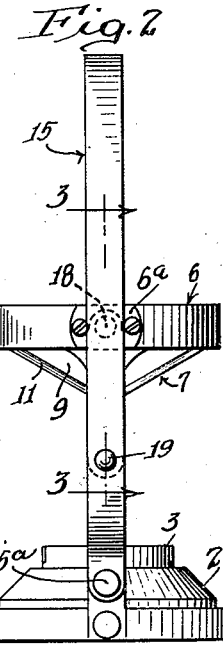
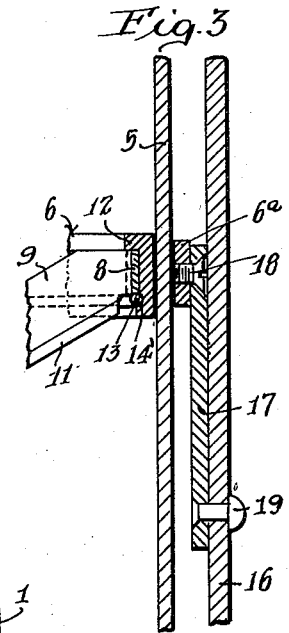
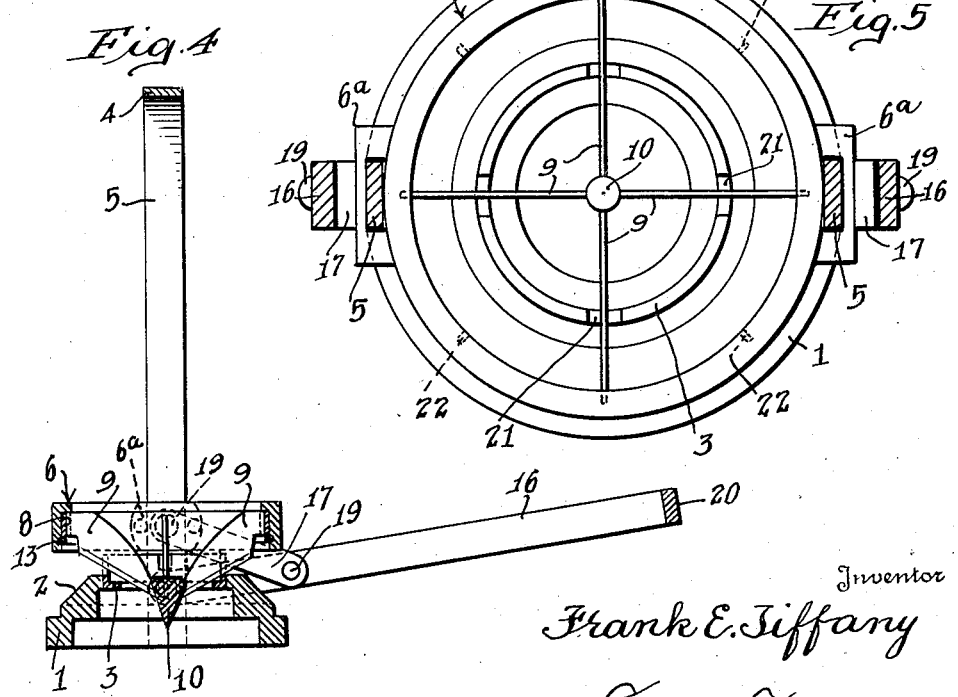
Inventor
Frank E. Tiffany
By Lyon & Lyon
Attorneys Patented Sept. 29, 1942

2,297,177

UNITED STATES PATENT OFFICE 2,297,177

FRUIT CUTTING APPARATUS

Frank E. Tiffany, Claremont, Calif., assignor to California Fruit Growers Exchange, Los Angeles, Calif., a corporation of California Application June 19, 1940, Serial No. 341,293

4 Claims. (Cl. 146—160)

This invention relates to a cutting device that is particularly adapted for cutting fruit or vegetables into segments.

One of the objects of the invention is to provide a cutting device of simple construction, and having means for receiving and holding the article that is to be sliced, and capable of dividing the article to be sliced into segments by means of cuts passing substantially completely through the article or fruit that is being cut.

A further object of the invention is to provide a cutting device of this type, with a removable cutter of simple construction that presents a plurality of slicing blades and which, at the same time, is so constructed that it can be readily removed so that the edges of the blades can be sharpened; also to construct the removable cutter so that when so removed, the cutting edges of the blades are readily accessible to a grinder or sharpener device.

A further object of the invention is to provide a cutting device of this type, in which the cutter is provided with a central spur for penetrating the article to be cut into segments; and radial blades forming a unitary structure with the central spur and the ring, so that the ring and all of the blades can be removed as a unit for sharpening the blades.

A further object of the invention is to provide a cutting device of this general type, in which the upper portion of the frame of the device and the operating lever for the cutting frame, will operate as a convenient handle for carrying the cutting device.

Further objects of the invention will appear hereinafter.

The invention consists in the novel parts and combination of parts to be described hereinafter, all of which contribute to produce an efficient fruit cutting apparatus.

A preferred embodiment of the invention is described in the following specification, while the broad scope of the invention is pointed out in the appended claims.

In the drawing:

Fig. 1 is a side elevation of the cutting device embodying my invention and illustrating in dotted lines an article such as a fruit set in the device, ready to be cut into segments.

Fig. 2 is a side elevation of the device illustrated in Fig. 1, looking at the frame of the device in edge view.

Fig. 3 is a vertical section upon an enlarged scale upon the line 3—3 of Fig. 2, and particularly illustrating details of the cutter frame and the means for guiding the same in its movements to and from the base of the device that supports the fruit. This view also illustrates details of the construction of the cutter, and the means for removably holding the same in the cutter frame.

Fig. 4 is a vertical section through the cutting device, showing the cutter frame in its extreme depressed position in which its blades will be made to pass completely through the fruit.

Fig. 5 is a horizontal section taken upon the line 5—5 of Fig. 1, upon an enlarged scale, and further illustrating details of the construction.

In practicing the invention, I provide a simple frame having a base on which the fruit or article to be cut rests, and on this frame I provide a movably guided cutter frame that can be moved toward or from the base. This cutter frame carries a removable cutter having a unitary structure, and comprising a ring and substantially radial blades, the outer ends of which are secured in the ring, and the inner ends of which meet at a central point substantially on the axis of the base. At this central point it is preferable to provide a point or spur which penetrates the fruit, and this spur is preferably depressed considerably below the lower edge of the ring, thereby enabling the lower edges of the blades to be readily applied to a grinder. Such an application to a grinding wheel is difficult where the cutting edges of the blades are radial, and located at the same level as the outer ring of the cutter.

Referring more particularly to the parts, 1 indicates the base preferably of round form, having sufficient body to give stability to the device in operation. This is necessary of course, if the device is not to be secured to a table top or shelf. In the present instance the body 2 of the base is of substantially conical form, and the upper face of the body is provided with upwardly projecting means such as a fixed collar 3 which forms a rest or rudimentary cup to receive the fruit. The frame of the device preferably includes an upper handle or bar 4 of bow form, which integrally connects two side bars 5, the lower ends of which are secured rigidly at diametrically opposite points to the base 1.

On the bars 5 a cutter frame 6 is guided to slide up and down, said cutter frame being of annular form and provided at diametrically opposite points with shoes 6ª that cooperate with the annular cutter frame 6 to envelop the guide bars (see Fig. 5).

The cutter frame 6 carries a removable cutter 7 which includes an outer ring 8 and a plurality of substantially radial blades 9, the outer ends of which are rigidly secured against the ring 8. These blades incline downwardly toward the central axis of the device where they are all connected together, and to accomplish this I prefer to employ a central point or spur 10, which is preferably a molded part, the sides of which embed the adjacent ends of the blades. In this way the radial blades, the ring and the point, all form a unitary structure which can be readily removed from the cutter frame 6 for cleaning and sharpening the cutting edges 11 of the blades.

These edges incline downwardly at a considerable angle toward the spur 10, which is depressed a considerable distance below the lower edge of the ring 8. This feature is of some importance because it greatly facilitates sharpening these edges on a grinder wheel. It also facilitates the application of a sharpening abrasive tool to these edges, if it should be desired to sharpen the edges in this way.

The cutter is preferably inserted in the annular cutter frame 6 from below, and seats against an annular shoulder or flange 12 that projects inwardly at the upper end of the cutter frame (see Fig. 3).

Any suitable means may be provided for removably holding the cutter 7 in place. For this purpose I have illustrated the spring ring 13 which may be snapped into a groove 14' extending around the interior of the frame 6 near its lower edge. By inserting the cutter from below in this way, it has a solid seat on the shoulder or flange 12, and hence the thrust exerted by the slot on the cutter, does not tend to dislodge it.

Any suitable means may be provided for actuating the cutter frame. In the present instance I provide an upstanding lever 15 pivotally attached to the frame of the device, at 15a; and this lever is preferably of bifurcated form so that it presents two arms or forks 16 lying outside of the side bars 5, and connected to the same by two links such as the links 17. Of course, it is not essential that the operating lever be of bifurcated form, as a single link 17 could slide the cutter frame 6 up and down if properly designed, although it is desirable to have this sliding force applied to each of the shoes 6a. For this purpose each of the links 17 is attached by a pivot pin or screw 18 to the outer face of its adjacent shoe 6a, the rear end of each link being attached by a pivot pin or rivet 19 to the lower portion of one of the side arms 16. With this construction it will be evident that the handle portion 20 of the operating lever may be swung down to an extreme position as indicated in Fig. 4. This will cause the point or spur 10 to penetrate the fruit and cause the blades 9 to pass down through the fruit with a slicing action. This will divide the fruit into segments. In order to provide clearance for the cutting edges 11 of the blades, and also to insure that the blades can be made to pass completely through the fruit, the collar 3 is provided with clearance notches 21.

Although I have illustrated this cutting device as provided with four radially disposed blades, it should be understood that any number of blades for this purpose may be provided; and extra notches 22 may also be provided on the inner face of the ring 8, to receive the outer ends of additional blades if desired, in which case additional notches 22 would be also provided.

This cutting device is very useful for cutting fruits such as apples, oranges, and lemons, into segments; but it is obvious that by making it of greater vertical height and of proper design, it can readily be employed for slicing melons into elongated slices, such as frequently used in serving melons.

Many other embodiments of the invention may be resorted to without departing from the spirit of the invention.

What I claim is:

1. In a cutting device, the combination of a base to rest upon a support, a bail having substantially vertical side bars attached to the base, said base having a holder for the article to be cut, including an annular part, a cutter having a center to penetrate the article to be cut, a plurality of substantially radial blades extending outwardly therefrom, a cutter frame guided on said bars and removably carrying said cutter, and an operating lever for the cutter normally disposed in a substantially vertical plane, for forcing the same down toward the base, mounted to swing in a plane transverse to the plane of said side bars, having side forks pivotally attached at their lower ends to the outer sides of the side bars, and having means attached to the inner sides of the forks connecting the same with the cutter frame for enabling the lever to operate as a lever of the second class in actuating the cutter.

2. In a cutting device, the combination of a base to rest upon a support, said base having upwardly projecting means for retaining the article to be cut on the upper face of the base, an annular cutter frame disposed above the base, having an annular shoulder projecting inwardly, means for guiding the annular cutter frame to move down and toward or away from the base, a removable cutter including an outer ring and a plurality of radially disposed blades secured to the ring, said outer ring seating on said shoulder from below, so that in cutting, the thrust of the cutter frame is exerted through the shoulder, and removable retaining means for retaining the cutter ring on the shoulder, said annular cutter frame having an annular groove for engaging and supporting the retaining means.

3. In a cutting device, the combination of a base to rest upon a support, a bail having substantially vertical side bars attached to the base, said base having a holder for the article to be cut, including an annular part, a cutter having a center to penetrate the article to be cut, a plurality of substantially radial blades extending outwardly therefrom, a cutter frame guided on said bars and removably carrying said cutter, and a bifurcated operating lever for the cutter for forcing the same down toward the base, mounted to swing in a plane transverse to the plane of said side bars, having forks pivotally attached at their lower ends to the outer sides of the side bars, located on the outer side of the side bars, and spaced therefrom; and links located respectively between the fork and side bar at each side, each link pivotally attached at its lower end to the side bar, and at its upper end to the cutter frame for reciprocating the same.

4. In a cutting device, the combination of a base to rest upon a support, a bail having an elevated handle and substantially vertical side bars attached to the base, said base having a holder for the article to be cut, including an annular part, a cutter having a center to penetrate the article to be cut, a plurality of substantially radial blades extending outwardly therefrom, a cutter frame guided on said bars and removably carrying said cutter, and an upstanding operating lever for the cutter having a handle overlying the handle of the bail, for forcing the cutter frame away from the handle and down toward the base, mounted to swing in a plane transverse to the plane of said side bars, said handle having forks pivotally attached at their lower ends to the side bars, and located on the outer side of the side bars, and spaced therefrom; and a link at each side located between a side bar and a fork, each link pivotally attached at its lower end to the side bars, and at its uper end to the cutter frame for reciprocating the same.

FRANK E. TIFFANY.